United States Patent

Carter et al.

[15] 3,688,265

[45] Aug. 29, 1972

[54] ERROR-FREE DECODING FOR FAILURE-TOLERANT MEMORIES

[72] Inventors: William C. Carter, Ridgefield, Conn.; Robert A. Henle, Port Chester, N.Y.; Donald C. Jessep, Jr., Pound Ridge, N.Y.; Aspi B. Wadia, Chappaqua, N.Y.

[73] Assignee: International Business Machines Corporation, Armonk, N.Y.

[22] Filed: March 18, 1971

[21] Appl. No.: 125,652

[52] U.S. Cl. .......................................340/146.1 AL

[51] Int. Cl. ........................G08c 25/00, G06f 11/00

[58] Field of Search .........340/146.1, 172.5; 235/153

[56] References Cited

UNITED STATES PATENTS

| | | | |
|---|---|---|---|
| 3,559,167 | 1/1971 | Carter et al. | 340/146.1 |
| 3,559,168 | 1/1971 | Carter et al. | 340/146.1 |
| 3,568,153 | 3/1971 | Kurtz | 340/146.1 |
| 3,582,878 | 6/1971 | Bossen | 340/146.1 |
| 3,601,798 | 8/1971 | Hsiao | 340/146.1 |

*Primary Examiner*—Charles E. Atkinson
*Attorney*—Hanifin and Jancin and Victor Siber

[57] ABSTRACT

A translator for a digital memory system which performs single error correction and double error detection (SEC/DED) upon the stored word in converting it into a parity-encoded form and in addition detects circuit failures in the translator itself. The translator also takes a parity-encoded word, checks the parity encoding, translates the word into an SEC/DED form and writes it into memory. The translator consists of a syndrome generator, a single error corrector, a double error detector, a byte parity encoder, a byte parity checker and a circuit to implement a check on the parity-encoded form of the word which is read. The parity-check matrix used in formulating the SEC/DED encoded form of the word has the following properties:

Property 1:
The columns of the parity check matrix are a minimum Hamming distance of 2 apart.

Property 2:
Each column of the parity check matrix is odd weight.

Property 3:
If there are $r$ check bits $C(j)$, $m$ bytes with parity bits $P(i)$, and odd parity is used, then $$C(1) \quad C(2) \quad \ldots \quad C(r) \quad P(1) \quad \ldots \quad P(m) = (r+m) \bmod 2$$

7 Claims, 17 Drawing Figures

INVENTORS
WILLIAM C. CARTER
DONALD C. JESSEP, JR.
ROBERT A. HENLE
ASPI B. WADIA

BY Victor Siber
AGENT

PATENTED AUG 29 1972 3,688,265

SHEET 09 OF 16

ERROR-FREE DECODING FOR FAILURE-TOLERANT MEMORIES

The invention described herein was made in the performance of work under a NASA contract and is subject to the provisions of Section 305 of the National Aeronautics and Space Act of 1958, Public Law 85-568 (72 Stat. 435; 42 USC 2,457).

CROSS-REFERENCE TO RELATED APPLICATIONS

Reference is hereby made to application Ser. No. 747,553, now U.S. Pat. No. 3,559,167 of W. C. Carter, Keith A. Duke, and P. R. Schneider, filed July 25, 1968 and entitled "Self-Checking Error Checker for Two-Rail Coded Data" and to application Ser. No. 99,083 of W. C. Carter and P. R. Schneider filed Dec. 17, 1970 and entitled "Self-Checking Error Checker for Parity Coded Data" and to application Ser. No. 747,665, now U.S. Pat. No. 3,559,168 of W. C. Carter, K. A. Duke, and P. R. Schneider filed July 25, 1968 and entitled "-Self-Checking Error Checker for *k*-Out-of-*n* Coded Data". These applications may be helpful for a better understanding of the principles and operation of the present application.

BACKGROUND OF THE INVENTION

The present invention relates to a memory translation system that is self-checking. More specifically, it relates to a digital memory translation system providing single error correction and double error detection wherein circuit failures within the translator itself are detected.

In the present state of the data processing art, the relative unreliability of memory systems, have caused systems architects and designers to utilize error correction and detection coding for memory words. The increase in the size of memory words together with the present SEC/DED devices required of new memory techniques have increased the probability that circuit failures in the SEC/DED itself, occur with equal probability of double failures in the memory words.

Present memory systems provide error detection and correction of data errors by various techniques. Probably the most widespread is the use of parity checking wherein an extra bit or bits accompany the transmitted data bits and are utilized to indicate the correctness of the data of a particular transmission, i.e., normally the parity bit indicates whether an odd or even number of "one's" appear in the data transmission proper. However, for such parity checking systems, means must be provided for generating the proper parity bits at various transmission points within the computer and additional means must be provided for checking the parity.

Further advances in the art, have resulted in numerous error detection and correction codes. One class of such codes is generally known as single error correction, double error detection codes (SEC/DED). Techniques for constructing such a code may be found in Hamming, R. W., "Error Detecting and Error Correcting Codes", *Bell Systems Technical Journal*, 29, 1950, pages 147–160.

A further technique utilized in the prior art for error detection and correction, is the development of "syndromes" which indicate whether errors have occurred and which particular bit in the data segment of a particular word need be corrected. One such example, may be found in U.S. Pat. No. 3,478,313.

All of the above-mentioned prior art, codes and systems, while providing error detection and possibly correction of data errors occurring in a memory or storage device, are susceptible to circuit failures and errors generated in the code translator from the memory to the data registers of the processor using the information. Therefore, at present, translator systems are not self-checkable during normal processing. In other words, if the translator were subjected to failure, errors might go undetected, or correct data might be erroneously modified so that erroneous data would be provided to the machine from its memory in spite of SEC/DED codings used.

OBJECTS OF THE INVENTION

Therefore, it is an object of the present invention to provide an improved memory translation circuit utilizing a new SEC/DED code decoding and encoding.

It is a further object of the present invention to provide an SEC/DED translator which detects circuit failures in the translator itself.

It is a further object of the present invention to provide a self-testable SEC/DED translator that performs the single error correction and double error detection by means of conventional circuitry.

It is a further object of the present invention to provide a translator which operates on a new SEC/DED code which provides indications as to circuit failures in the translator and double errors in the data words while correcting all single data errors created in the main store.

SUMMARY OF THE INVENTION

In the present invention a self-testing translator structure having a high degree of error control is provided for a digital memory system. Error control is accomplished by utilizing a class of codes known as single-error-correcting, double-error-detecting. The inventive system that utilizes this code provides the following features in a self-testable system:

1. When all data is correct, the self-testing system (a) implements a double data error indication circuitry; (b) implements a final data check indication circuitry; (c) generates syndrome bit pairs, and all $2^r$ input syndrome patterns are made to appear on the syndrome lines.

2. When all data is correct, circuits and encoding means detect any circuit failure in the translator which causes an erroneous output.

3. When a single error appears in the data obtained from data store, the self-testing circuit means (a) corrects all single data errors when no circuit failures are present; (b) never generates undetected erroneous output even with an accumulation of previously undetected failures; (c) detects accumulated double, triple or further circuit failures in the circuitry which is not self-tested, with a low probability of having an undetected erroneous output.

The above features are obtained by a translator operating on a SEC/DED code with a Hamming distance of 4 for each code word, said code having the following properties.

Property 1:

The columns of the parity check matrix have a minimum Hamming distance 2 apart.

Property 2:

Each column of the parity check matrix is odd weight.

Property 3:

Assuming that there are $r$ check bits $C(j)$ $m$ bytes with parity bits $P(i)$, and odd parity is used in the system, then $$C(1) \oplus C(2) \oplus \ldots \oplus C(r) \oplus P(1) \oplus \ldots \oplus P(m) = (r+m) \bmod 2$$

The translator built in accordance with the SEC/DED code having the above properties consists of a syndrome generator, a single error correcter, a double error detector, a byte parity encoder, a byte parity checker and a circuit to implement the check based on Property 3 of the code. In addition to these check circuits, there are two registers, the Data Word Register, which contains data in SEC/DED code, and the Memory Data Register, containing corrected data in byte parity format.

The foregoing and other objects, features and advantages of the invention will be apparent from the following more particular description of a preferred embodiment of the invention, as illustrated in the accompanying drawings.

THEORY OF THE CODE

Figure 1:
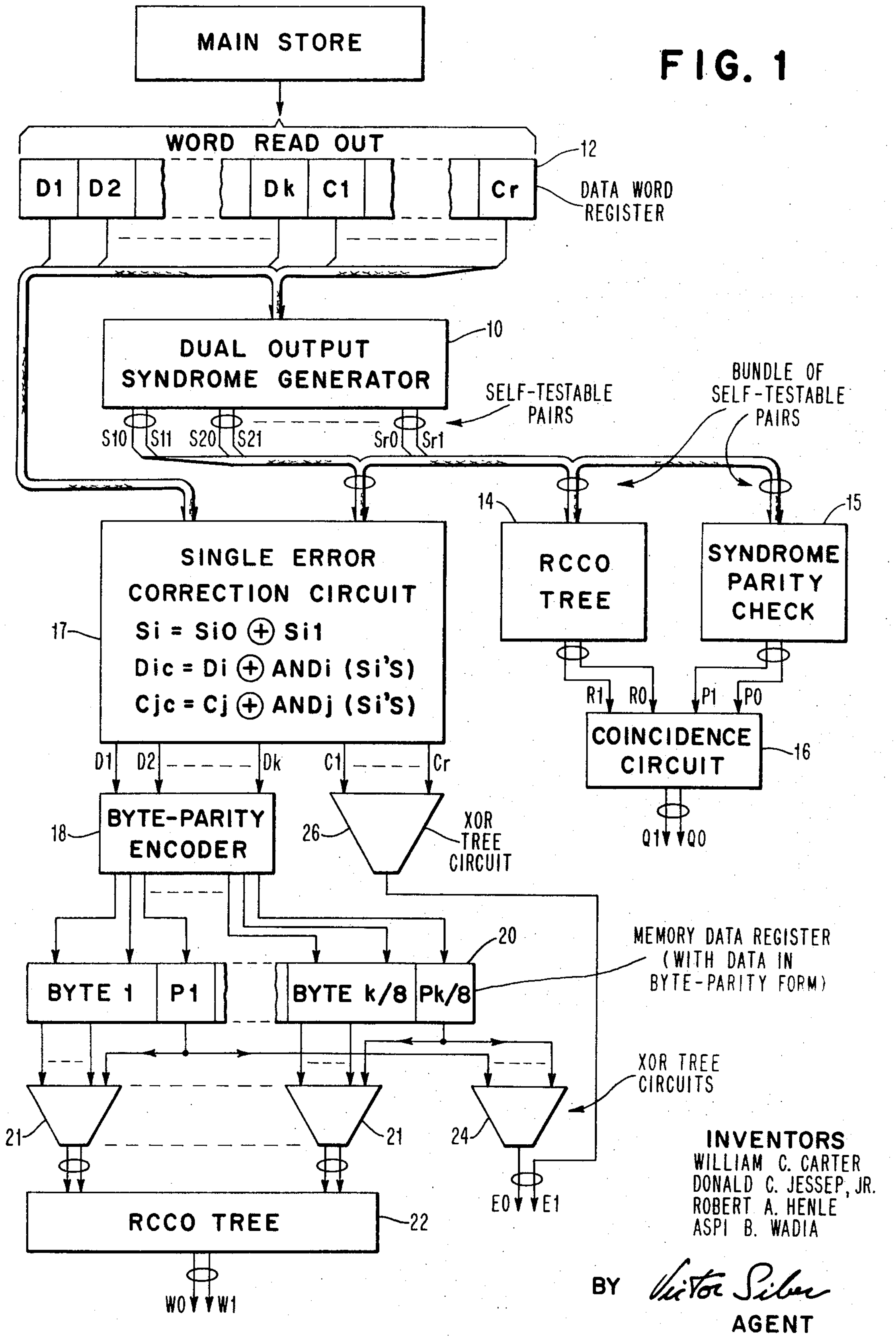
FIG. 1 is a block diagram of a translator that provides SEC/DED plus detection of circuit failures within the translator itself as the word is read out of memory.

A word as used in the preferred embodiment of this invention consists of 64 data bits D(1), D(2)...D(64) and eight check bits C(1), C(2)...C(8). However, it should be recognized, that the code is completely general and is not limited to such a structure.

For the purpose of describing and illustrating the invention presented herein, standard notation utilized in coding theory will be adhered to. In addition, ordinary syndromes are referred to by the notation S, and $Si = (s(io) \oplus s(i1))$ in self-testing notation. In the preferred embodiment, $n$ bits shall comprise a memory word, with $k$ data (or message) bits $D(j)$ and $r$ check bits $C(i)$. It is well recognized in the art, that basic work on SEC/DED and other codes was presented by R. W. Hamming. In the usual parity check matrix, as presented by Peterson, W. W., *Error-Correcting Codes*, John Wiley and Sons and MIT Press, New York, N. Y., 1961, the implementation of the row of all "1's", which correspond to the double error detection process, requires approximately twice as many inputs as the implementation of any other row. It has been found in developing the code of the preferred embodiment, that the number of inputs could be reduced by a factor of one-half by specifying each column in the parity check matrix as having an odd number of "1's". In this case, the double-error detection property would be retained since a double input error would result in an even number of syndromes being 0, while a single error would cause an odd number of syndrome bits to be 0. Odd parity is the convertion used herein, so that all syndrome bits being identically 1 infers that no error has occurred.

In order to construct a parity check matrix, H, for a new set of codes with $r$ check bits and $k$ data bits, it is necessary to first choose the $\binom{r}{1}$ combination of 1 and $r-1$ zeros and assign the column with single 1 in the $i^{th}$ place to the check bit $Ci$, where $1 \leq i \leq r$. If $k \leq \binom{r}{3}$, it is then necessary to choose $k$ distinct combination of three 1's and $(r-3)$ 0's at columns corresponding to the data bits. If $\binom{r}{5} \geq k \geq \binom{r}{3}$, then it is necessary to choose all $\binom{r}{3}$ combinations of three 1's and $(r-3)$ zeros and $[k-\binom{r}{3}]$ distinct combinations of five 1's and $(r-5)$ zeros as columns in the H parity check matrix. Then, it is possible to continue with 5, 7, 9..., etc. bits in a column equal to 1.

In order to implement the self-checking preferred embodiment of an SEC/DED translator, the new code whose code words have a Hamming distance of 4 must have the following properties.

Property 1:

The columns of the parity check matrix have a minimum Hamming distance 2 apart.

Property 2:

Each column of the parity check matrix is of odd weight.

Property 3:

For $r$ check bits $C(j)$, and $m$ bytes with parity bits $P(i)$, and odd parity being used, then $$C(1) \oplus C(2) \oplus \ldots \oplus C(r) \oplus P(1) \oplus \ldots \oplus P(m) = (r+m) \bmod 2$$

MATHEMATICAL PROOFS OF THE CODE

The following proofs demonstrate all of the self-testing and self-checking capabilities of the circuits utilized in the preferred embodiment.

The sum mod 2 (Exclusive-OR or XOR) of the syndromes is $r$ mod 2. If the syndrome equations are XOR'd, then from property 2 of the parity check matrix, each $C(j)$ appears once and each $D(i)$ an odd number of times, so $$D(1) \oplus D(2) \oplus \ldots \oplus D(k) \oplus C(1) \oplus \ldots \oplus C(r) = r \bmod 2. \quad (1)$$

Forming the XOR of all outputs bytes, $$D(1) \oplus D(2) \oplus \ldots \oplus D(k) \oplus P(1) \oplus \ldots \oplus P(m) = m \bmod 2 \quad (2)$$

Then by forming the XOR of equation (1) and (2), property 3 of the code may be stated as $$C(1) \oplus \ldots \oplus C(r) \oplus P(1) \oplus \ldots \oplus P(m) = (r+m) \bmod 2.$$

Now, let $\rho = \min(\rho_i)$, where $\rho_i$ is the number of 1's in the $i^{th}$ row of the parity check matrix (the notation $i$ underneath the word "min" represents the minimum over all values of $i$). Then, the following algorithm will select subsets of the set $Di = [D(i_1), \ldots, D(i_{\rho-1})]$ of data bits that have 1's in the $i^{th}$ row of the parity check matrix so that $[(s(10), s(11)), (s(20), s(21)), \ldots, (s(r0), s(r1))]$ will take on all $2^r$ values, and the syndrome generator will have minimum circuit delay.

Step 1. Choose any of $[\rho/2]$ elements of D1 and form $s(10)$ as an XOR of these elements.

Step 2. Choose $[\rho/2]$ elements of $D(r)$ with one element different from the set chosen in Step 1, and form $s(20)$ as XOR of these elements.

Step $r$. Choose $[\rho/2]$ elements of D($r$) with one element different from the elements of the union of sets chosen in Step 1, Step 2,..., Step ($r$—1) and form $s(r0)$ as XOR of these elements.

If the required choice at any stage cannot be made, the process is repeated from Step 1, again choosing in each step $[\rho/2]-1$ elements. If again unsuccessful, the process is repeated choosing $[\rho/2]-2$ elements, and so on. Note that the ultimate choice of a single element in each step will always work. Since the $r$ sets are linearly independent, the $s(i0)$'s take on all $2^r$ values and hence so will $[(s(10), s(11)), (s(20), s(21)),\ldots,(s(r0), s(r1))]$. Choosing the number of bits involved in the generation of $s(i0)$ as near to $[\rho/2]$ as possible gives minimum circuit delay.

Now referring to FIG. 1, the outputs of the RCCO tree and the syndrome parity check matrix [(R(0), R(1)), (P(0), P(1))], respectively take on all four values [(0,1), (0,1)], [(0,1), (1,0)], [(1,0), (0,1)] and [(1,0), (1,0)]. This is proven by examining $$P(0) = s(10) \oplus s(11) \oplus s(20) \oplus \ldots \oplus s(r0)$$

and $$R(0) = C(1)s(10)\ V\ C(2)s(11)$$

where C(1) and C(2) are Boolean functions independent of $s(10)$ and $s(11)$ and $C(1) \oplus C(2) = 1$ during normal operation. First choose values of $s(10)$ which make $P(0) = 0$, and $R(0) = \overline{\alpha}$ ($\alpha$ is either 0 or 1). Then, change the value of $s(10)$. Now, $P(0) = 0$, $R(0) = \alpha$. The argument is then repeated with $P(0) = 1$.

The following proves the testability of the single-error-corrector circuit lines. The implementation equations in the single-error corrector are:

$$\begin{array}{lll} Si & = s(10) \oplus s(1) & i = 1, 2, \ldots, r \\ \overline{S}i & = \overline{s(i0) \oplus s(i1)} & i = 1, 2, \ldots, r \\ D(ic) & = D(i) \oplus ANDi\ (T) & i = 1, 2, \ldots, k \\ C(jc) & = C(j) \oplus ANDj\ (T) & j = 1, 2, \ldots, r \end{array}$$

where AND$i$ is the AND gate into which T feeds, and T is an $r$-dimensional vector with an odd number of elements from [$\overline{S}(i)$, $\overline{S}(2)$,...,$\overline{S}(r)$] and its remaining elements from [S($i$), S(2),...,S($r$)] as determined by a column in the parity check matrix H. Also, S($i$) is one of the elements if $\overline{S}(i)$ is not. For example, $\overline{S}(1)\overline{S}(2)\overline{S}(3)S(4)$ and $S(1)\overline{S}(2)S(3)S(4)$ would be valid AND$i$(T)'s for $r = 4$.

The investigation of testability of the lines $S(i)$, $\overline{S}(i)$, AND$i$ $i = 1, 2,\ldots,(k+r)$ is carried out as follows. At first testability is examined in code space. Then, testability in single error space is examined with concentration on those failures which were undetectable in code space. Having obtained the set of single failures which are not detected either in code space or single error space, it is determined if further accumulation of undetected failures is possible. From this examination, it is determined that a failure in the single error corrector circuit is detected if the byte parity bits generated from the corrected data bits and the corrected check bits do not satisfy Property 3.

Testability in Code Space

In code space S($i$), $\overline{S}(i)$ and AND$i$ never take on the value 0, 1 and 1, respectively and therefore, the failures S($i$) stuck-at-1 ($s$-$a$-1), $\overline{S}(i)$ stuck-at-0 ($s$-$a$-0) and AND$i$ stuck-at-0 cannot be detected.

S($i$) $s$-$a$-0: For the error to originate, it is required that S($i$) should actually be 1, so $\overline{S}(i) = 0$ and no correction conjunct AND$j$ (T) must either contain S($i$) or $\overline{S}(i)$. None of the AND gates are activated and thus no erroneous correction results. The failure is undetected, and no error is introduced.

$\overline{S}(i)$ $s$-$a$-1: The AND gate corresponding to the correction conjunct $S(1)S(2)\ldots\overline{S}(i-1)\ S(i)S(i+1)\ldots S(r)$ is erroneously activated causing a check-bit to be erroneously corrected, so the check output E(1) is wrong. Since all data bits are correct, the output E(0) is unchanged, and the pair (E(0), E(1)) signal an error. Where (E(0), E(1)) is a self-testing pair of output lines that indicate a failure in the single error corrector circuit or a single failure in the circuit between the single error corrector and the lines providing the indication E.

AND$i$ $s$-$a$-1: The said AND gate is erroneously activated so one data bit and hence one byte parity bit is wrong or (exclusively) one check bit is wrong, and in either case the pair (E(0), E(1)) will signal an error.

Hence, the failures undetected in code space are S($i$) $s$-$a$-0, S($i$) $s$-$a$-1, $\overline{S}(i)$ $s$-$a$-0 and AND$i$ $s$-$a$-0.

Testability in Single Error Space

From Property 1 of the code, over single error space a single error in S($i$) or $\overline{S}(j)$ will only change one bit of a column and hence will not change one column of the parity check matrix into another.

Consider the failures undetected in code space.

S($i$) $s$-$a$-0: For an error to originate, $S(i) = 1$, $Si$ $s$-$a$-0 and $\overline{S}(i) = 0$ will inactivate all AND gates and no correction is made. One bit of the presumably corrected word is in error, and this will be detected by the check pair (E(0), E(1)).

$\overline{S}(i)$ $s$-$a$-0: For an error to originate, $\overline{S}(i) = 1$ so $S(i) = 0$. The proof is similar to that for S($i$) $s$-$a$-0 and the error is detected.

AND$i$ $s$-$a$-0: When the single error pattern that should activate this AND gate occurs, no correction will be made. The above proofs show this error will be detected.

S($i$) $s$-$a$-1: For an error to originate, $S(i) = 0$, so $\overline{S}(i) = 1$. Such a pattern will be one that activates an AND gate corresponding to a T that contains $\overline{S}(i)$ and thus not S($i$). The error thus does not effect this AND gate and the right correction is made. No erroneous correction is made and the failure is undetected. The output word is correct.

The only single failure that is undetected both in code space and single error space is S($i$) $s$-$a$-1, so failures in S($i$) $s$-$a$-1 can accumulate.

Testability of Various Lines of the Single-Error-Corrector Given that One S($j$) is $s$-$a$-1

For testability in code space, the arguments follow through just as discussed above with the same result viz. undetected failures are S($i$) ($i \neq j$) $s$-$a$-0, S($i$) ($i \neq j$) $s$-$a$-1, $\overline{S}(i)$ $s$-$a$-0 and AND$i$ $s$-$a$-0.

For testability in single error space, the arguments follow through just as for S($i$) $s$-$a$-0, $\overline{S}(i)$ $s$-$a$-0, and AND$i$ $s$-$a$-0.

S($i$) ($i \neq j$) $s$-$a$-1: The single error pattern that can cause errors to originate at both sites of failures must have $S(i) = S(j) = 0$, so $\overline{S}(i) = 1$ and $S(j) = 1$. The AND gate that should be activated by this pattern must correspond to a T(1) which contains $\overline{S}(i)$ and $\overline{S}(j)$ and not S($i$) or S($j$) and in this manner the right correction is made. First make $T(1) = [\bar{S}(i), \bar{S}(j)]\ U\ \tau$. Then $\tau$ will contain an odd number of elements from $[\bar{S}(1), \bar{S}(2), \ldots, \bar{S}(r)] - [\bar{S}(i), \bar{S}(j)]$ from the code property 2. If there are AND gates corresponding to $T(2) = [\bar{S}(i), S(j)$a $U\ \tau$, then $T(3) = [S(i), \bar{S}(j)]\ U\ \tau$ and $T(4) = [S(i), S(j)$a $U\ \tau$, then other data or check bits are changed. From Property 2, again, the AND gate corresponding to T(4) is the only one which exists, so that another output bit is erroneously changed, the XOR of the parity bits of the MDR 20 is erroneous, and the failure is detected.

Thus, accumulation of failures beyond a single $S(i)$ *s-a*-1 will never go undetected in code and single error space.

DETAILED DESCRIPTION OF THE INVENTION

In the preferred embodiment, specific circuits which have been proved to be self-testing are used in the translator SEC/DED preferred embodiment shown in FIG. 1. Particularly, the parity check circuit 15 is identical with that disclosed in U.S. Pat. application Ser. No. 99,083, and the subject matter of that patent application is herein incorporated by reference into the present application. For the odd parity case, the outputs of the checker 15 are $[{}^{01}_{10}]$ in code space and $[{}^{00}_{11}]$ in error space. Since each circuit has all combinations of variables applied to its inputs, each is extensively tested and the circuit is self-testing.

Another self-testing circuit utilized in the translator is a reduction circuit for checker outputs (RCCO) as fully described in U.S. Pat. No. 3,559,167. This RCCO circuit is used in the translator to reduce *r* pairs of syndrome lines to a single pair of lines with values $[{}^{01}_{10}]$, if all *r* pairs are in code space, and $[{}^{00}_{11}]$, if one or more of the *r* pairs are in $[{}^{00}_{11}]$. It should be noted that RCCO circuits may be interconnected and cascaded in tree form to reduce an arbitrary number of self-testing line pairs to a single pair of self-testing lines for ease of monitoring the original set of line pairs.

For a system which consists of interconnected modules to be self-testing, it is necessary and sufficient that each module be testable in the space defined by its inputs during normal operation of the system. However, when modules are designed to be self-testing as isolated units, their interconnection, to form a part of a larger system, does not necessarily provide a self-testing capability. This is true because the inputs of one module are outputs of another module, and they are no longer independent and all input patterns required for the testing of the successor module may not appear during normal operation of the system. It is necessary therefore, if it is desired to insure test of parity, to make the outputs of modules that feed into successor modules as independent as possible. In conventional SEC/DED circuitry, many lines in the correction and detection circuitry do not change logic states over this code space, and so have constant values. One approach to insure that line pairs experience a change of states over the code space, is to double the number of lines. However, this approach is very costly for implementing random logic functions.

A much preferred approach for obtaining reliable SEC/DED translator circuitry is to divide the structure into two parts, the double input error and circuit error detection circuitry and the single input error correcting circuitry. The error detecting circuitry is operable at all times, and is self-testing. This is necessary since the probability of circuit failure and double input data error are of the same magnitude. The error correcting circuitry is completely self-checking over both code space and single input error space.

Considering limitations as to the amount of circuitry needed to implement a translator, it is apparent that the entire circuitry cannot be self-testing over code space. Therefore, it is necessary that a failure of one or more components that are untested over code space must not change the completely self-checking feature of the circuitry over code and single error space. Furthermore, it is necessary that any component failure be ultimately detectable, either by itself or in combination of failures, over code or single error space. This is achieved by using a self-testing circuitry and by choosing the SEC/DED code discussed above, so that all circuit failures which are not detected over code space are either not harmful or finally result in a detectable error when the input from the memory contains a single error.

Referring to FIG. 1, there is shown a block diagram of the translator structure built in accordance with the SEC/DED code. To facilitate ease of understanding of the translator system, the structure of each testable block of the translator will be discussed in individual sections. Failure indications given by the three indicators Q, E and W are tabulated in Table I. Each indicator is (0,1) or (1,0) in code space and (0,0) or (1,1) in error space.

TABLE I

| Indicator | Failure Indication |
|---|---|
| Q: (Q(0), Q(1)) | Double error in memory word or (exclusively) at least one failure in the circuit between the Data Word Register and the lines providing the indication, Q. |
| E: (E(0), E(1)) | Failures in the single error corrector circuit that give a parity error in the output word from the corrector or (exclusively) a single failure in the circuit between the single error corrector and the lines providing the indication E. |
| W: (W(0), W(1)) | At least a single failure in the circuit between the single error corrector and the lines providing the indication W. |

Syndrome Generator

Syndrome bits generated by the syndrome generator 10 are formed in self-testing pairs $(s(10), s(11))$ $(s(20), s(21)), \ldots, (s(r0), s(r1))$. In code space, each pair is either (1, 0) or (0, 1). The syndrome generators are structured from two output XOR trees, which are self-testing. The XOR trees are shown in FIGS. 2A–2D as receiving the data word register 12 data bits and forming syndrome bits $(s(10), s(11))$ through $(s(80), s(81))$. Thus, a self-testable pair of eight syndrome bits are generated for every complete data word register. The XOR trees have the same number of inputs, or at most differ by 1. In addition, the syndrome pairs $[s(10), s(11)), (s(20), s(21)), \ldots, (s(r0), s(r1)]$ take all $2^r$ patterns during normal operation to insure testability of the succeeding blocks. In order to insure independency of syndrome lines, the $\bar{S}(1)$ through $\bar{S}(8)$ bits are generated independently of the S(1) through S(8) bits.

Double-Input Error Detection

As indicated in the above section containing proofs of the SEC/DED code, with an odd parity convertion, single input errors change an odd number of syndromes from 1 to 0, and double-input errors change an even number of syndromes from 1 to 0. When syndromes are implemented as self-testing parity check trees with dual outputs, a single input error changes an odd number of these pairs from one of code space to one of error space and a double input error changes an even number of these pairs in a similar manner. Self-testing capability of the double input error detection circuit is performed by the combination of the RCCO tree 14 and the syndrome parity check 15 through a coincidence circuit 16. The syndrome pairs ($s(i0)$, $s(i1)$) are provided as inputs to the RCCO 14 for reducing the plurality of set of self-testing pairs to a single set of outputs (R(0), R(1)) which in error space indicate that a minimum number of at least one error is present. The RCCO output (R(0), R(1)) will be in code space if all the syndromes indicate no input errors and will be in error space if one or more syndromes indicate an input error. Furthermore, if (R(0), R(1)) are connected as inputs to further self-testing circuit for providing a final error output, then the syndrome generation circuits 10 and the RCCO 14 will be completely self-tested. The detailed structure of the RCCO tree is shown in FIG. 2F.

The syndrome pairs are used to generate a second set of signals, $P = (P(0), P(1))$ by means of a parity check circuit according to the equations:

$$P(0) = s(10) \oplus s(11) \oplus s(20) \oplus s(30) \oplus \ldots \oplus s(r0)$$

and $$P(1) = s(21) \oplus s(31) \oplus \ldots \oplus s(r1)$$

in order that the set [(P(0), P(1)), (R(0), R(1))] takes all four values during normal operation. The values of (P(0), P(1)) are in code space when the syndromes indicate no input errors or when an even number of input errors are indicated. On the other hand, error space is indicated when an odd number of inputs are in error.

The signal pairs, (R(0), R(1)) and (P(0), P(1)) are used to form an indication of a double error condition in the following manner. If, (R(0), R(1)) and (P(0), P(1)) are in code space, then there are no single input errors or single circuit failures or any combination of single input error and single input circuit failures which have occurred. If (P(0), P(1)) is in code space, but (R(0), R(1)) is in error space, then there is either a double input error (an even number of syndrome bits are in error space) or a single circuit failure in generating (R(0), R(1)), or a failure in (P(0), P(1)) thus masking a single input error [this error would show except for the error in (P(0), P(1))]. If (P(0), P(1)) is in error space but (R(0), R(1)) is in code space, then there is a single circuit failure in generating (P(0), P(1)) or an error in generating (R(0), R(1)) thus masking a single input error. If both (R(0), R(1)) and (P(0), P(1)) are in error space, then there is a single input error (an odd number of syndrome bits are in error space). These conditions are set forth in a concise manner in TABLE II.

TABLE II

| Cases | (P(0), P(1)) | (R(0), R(1)) | Number of Combinations | Meaning |
|---|---|---|---|---|
| 1 | 0 1<br>1 0 | 1 0<br>0 1 | 4 | Codespace |
| 2 | 0 1<br>1 0 | 0 0<br>1 1 | 4 | Double Input Data Error or Circuit Error |
| 3 | 0 0<br>1 1 | 0 1<br>1 0 | 4 | Circuit Error |
| 4 | 0 0<br>1 1 | 0 0<br>1 1 | 4 | Single Input Data Error |

Figure 2A:
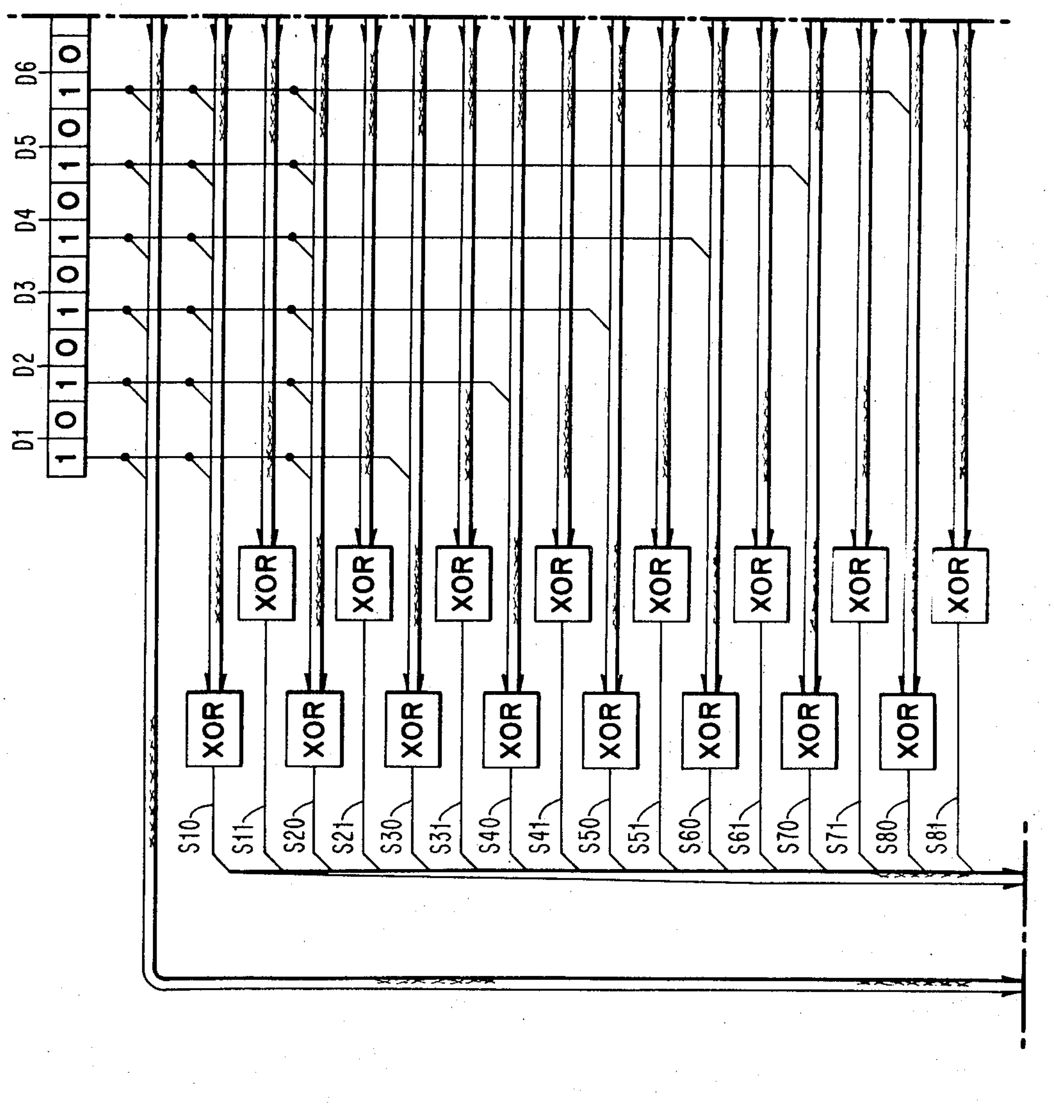
FIGS. 2A–2O show a detailed circuit diagram of the translator presented in FIG. 1.
Figure 2:
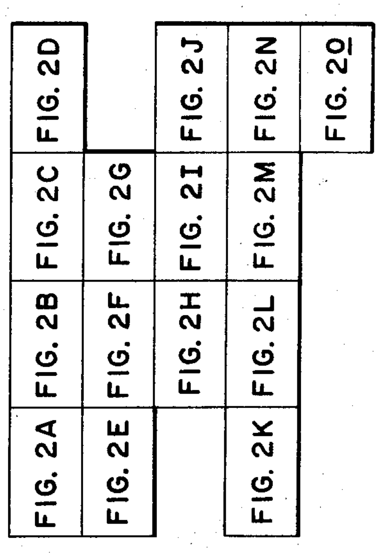
FIG. 2 illustrates the cooperative arrangement of FIGS. 2A–2O.
Figure 2B:
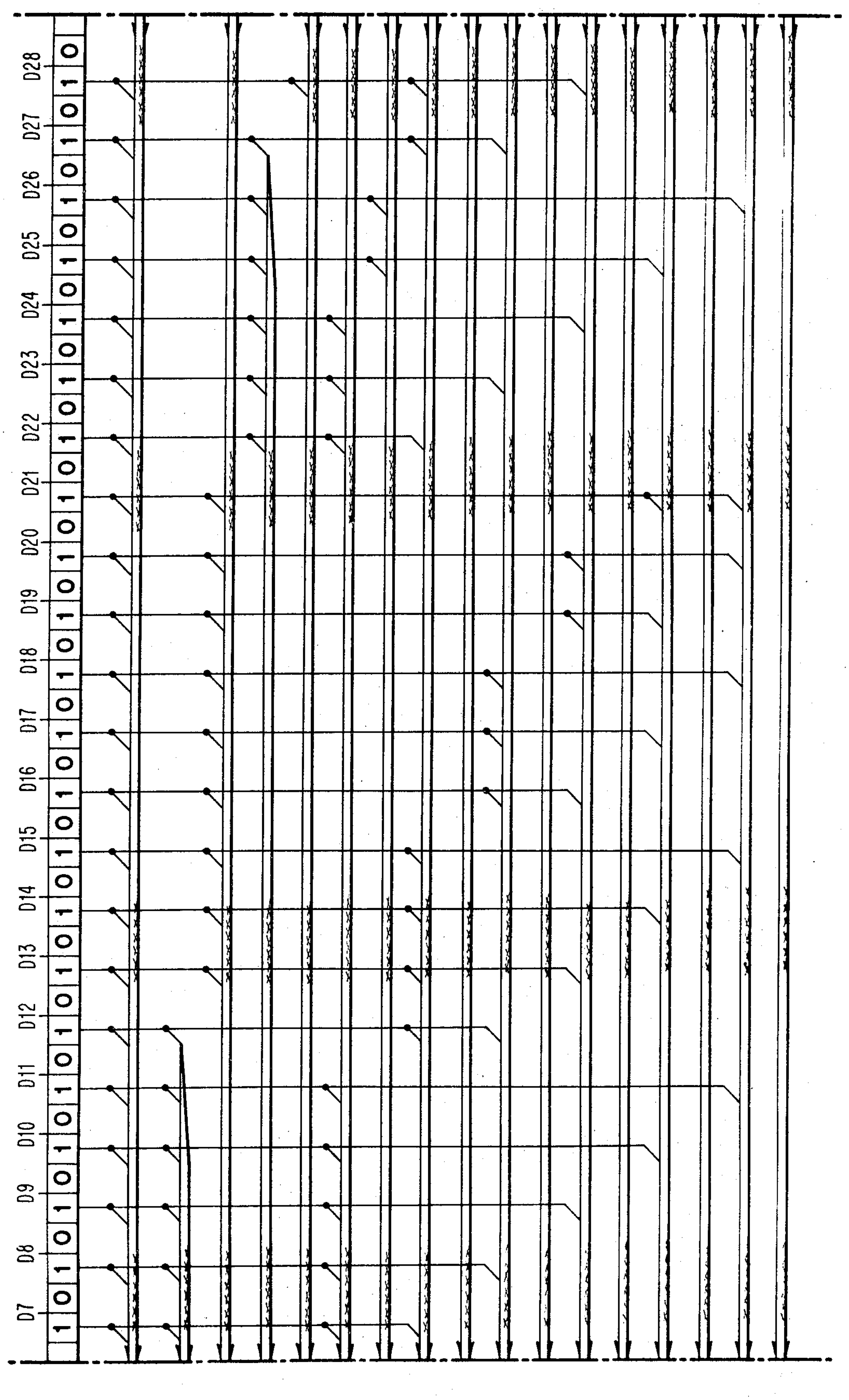
Figure 2C:
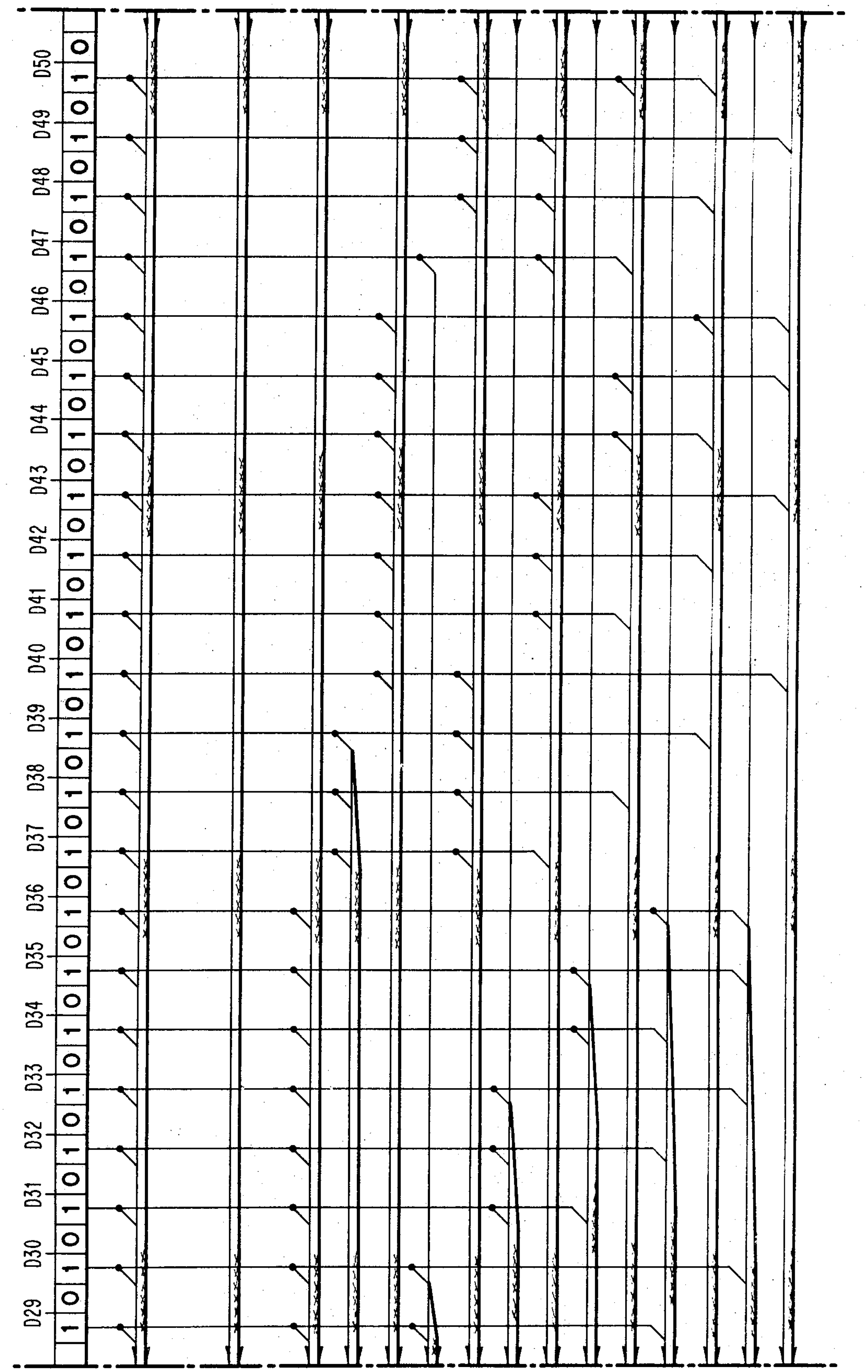
Figure 2D:
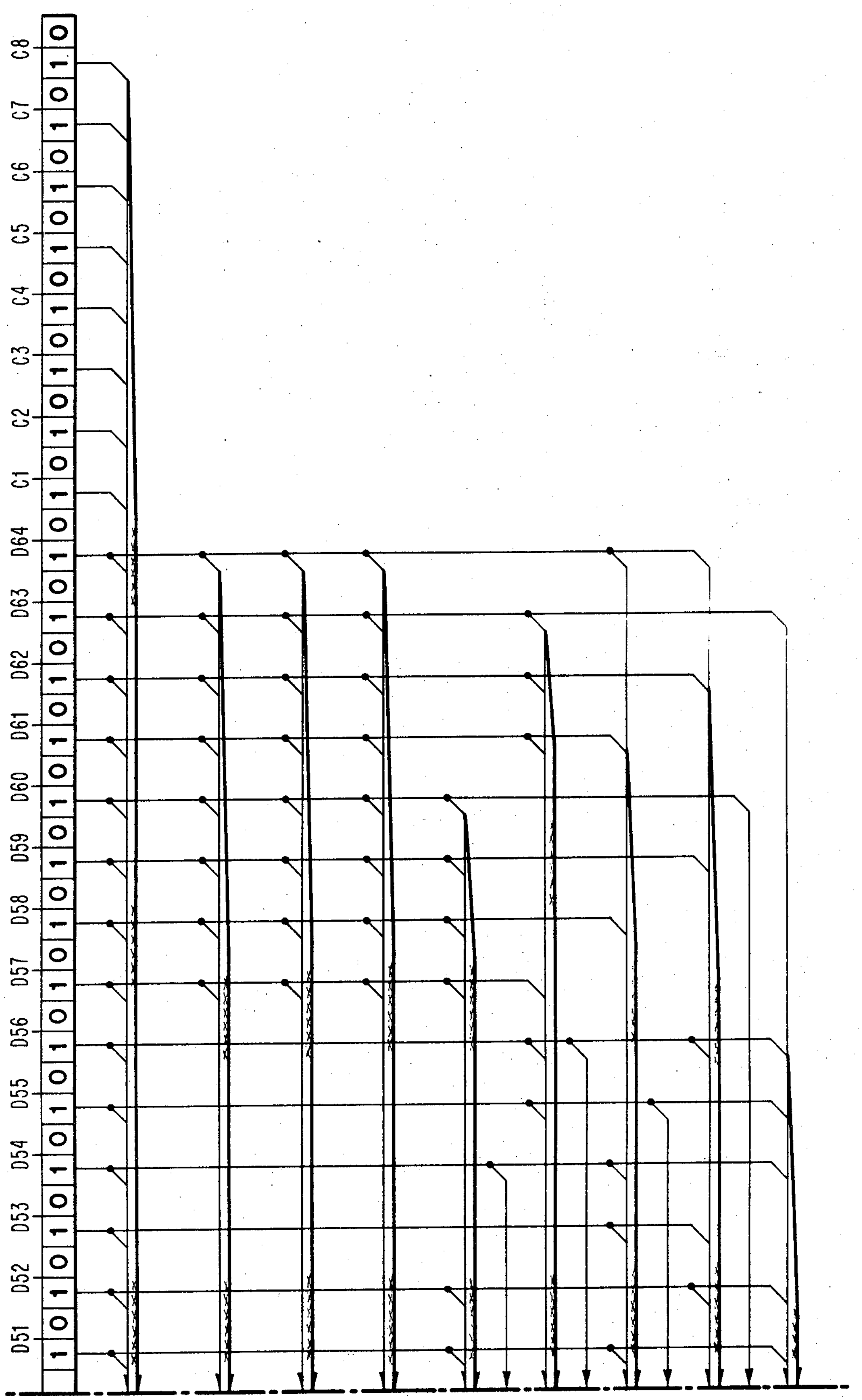
Figure 2E:
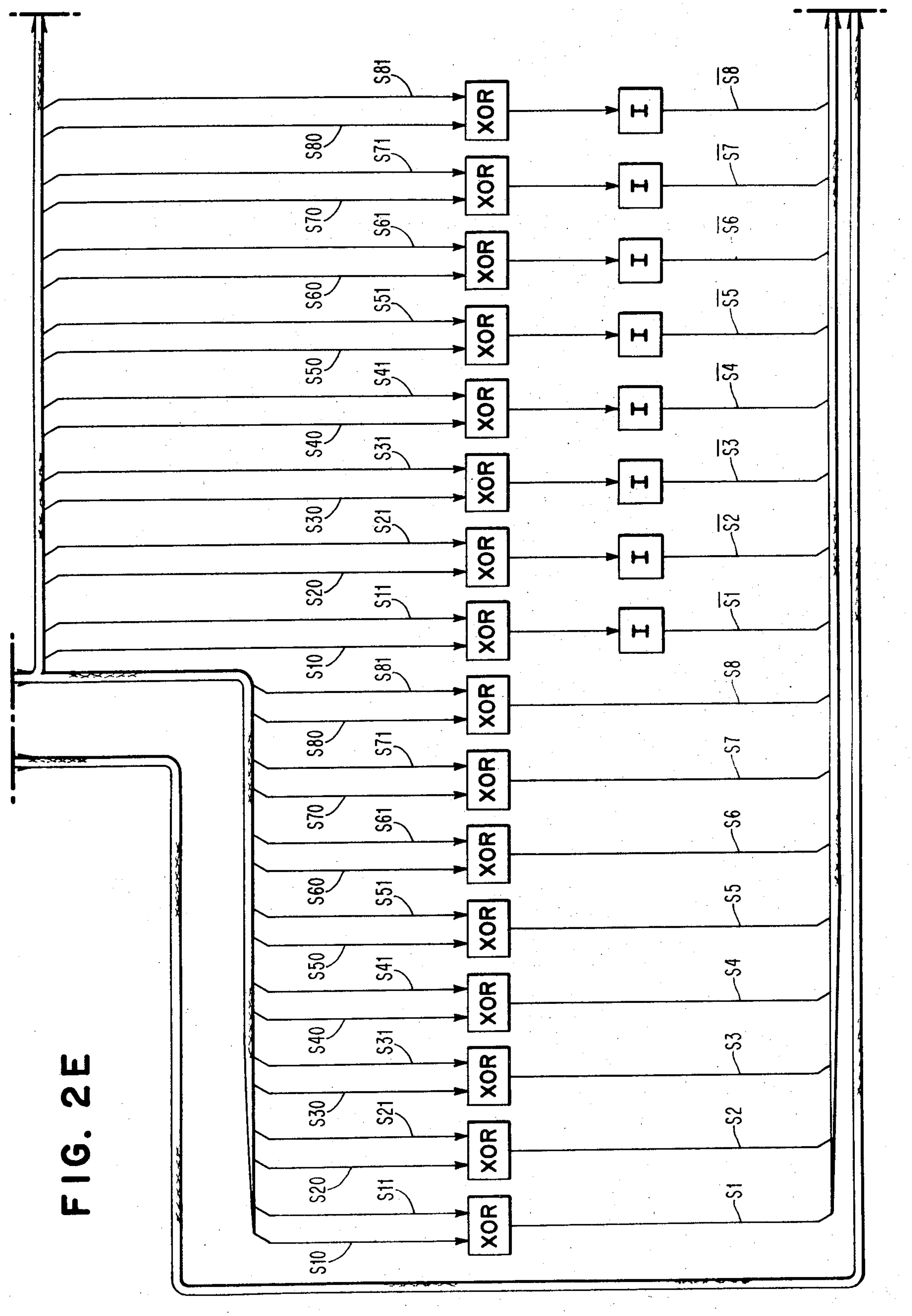
Figure 2F:
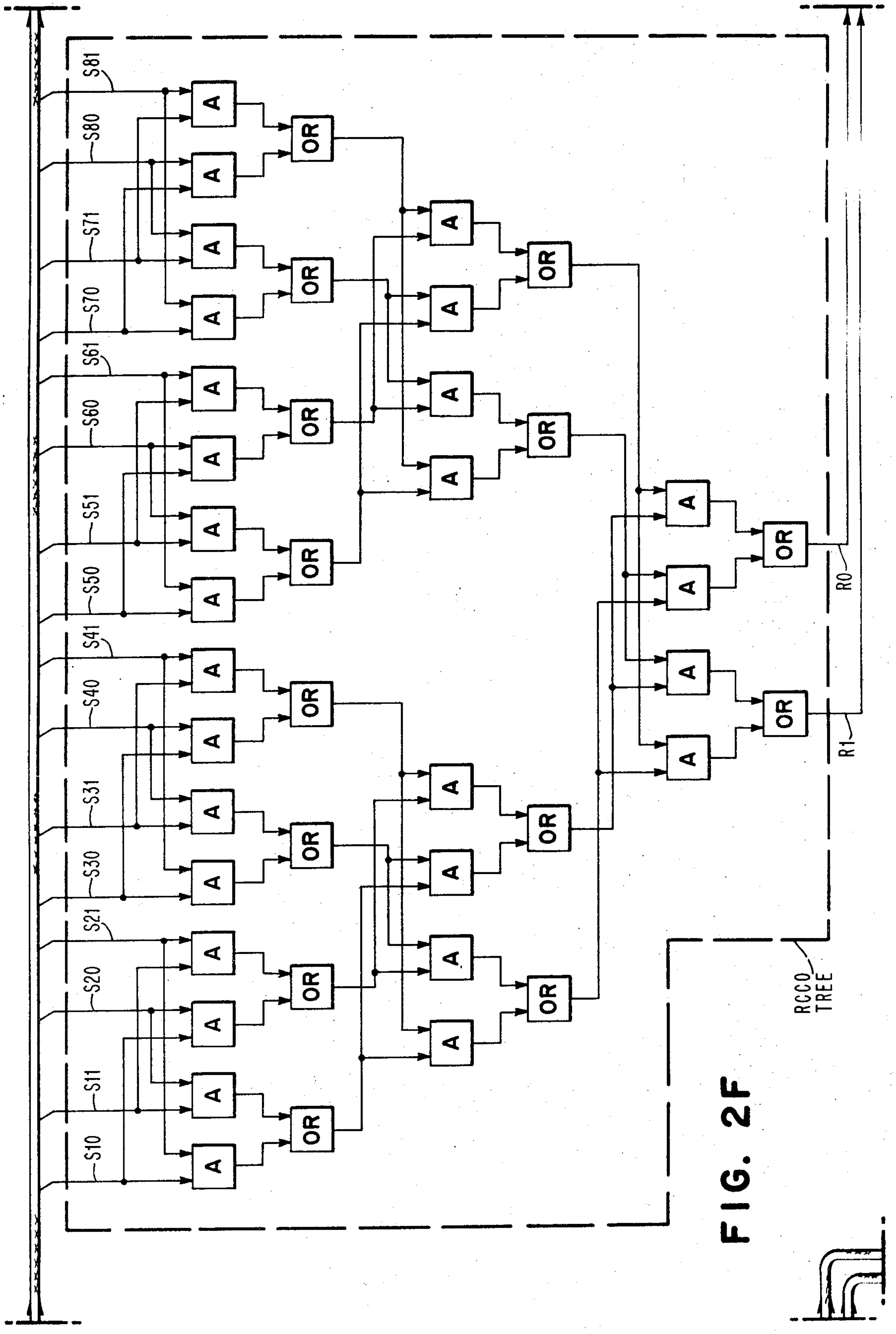
Figure 2G:
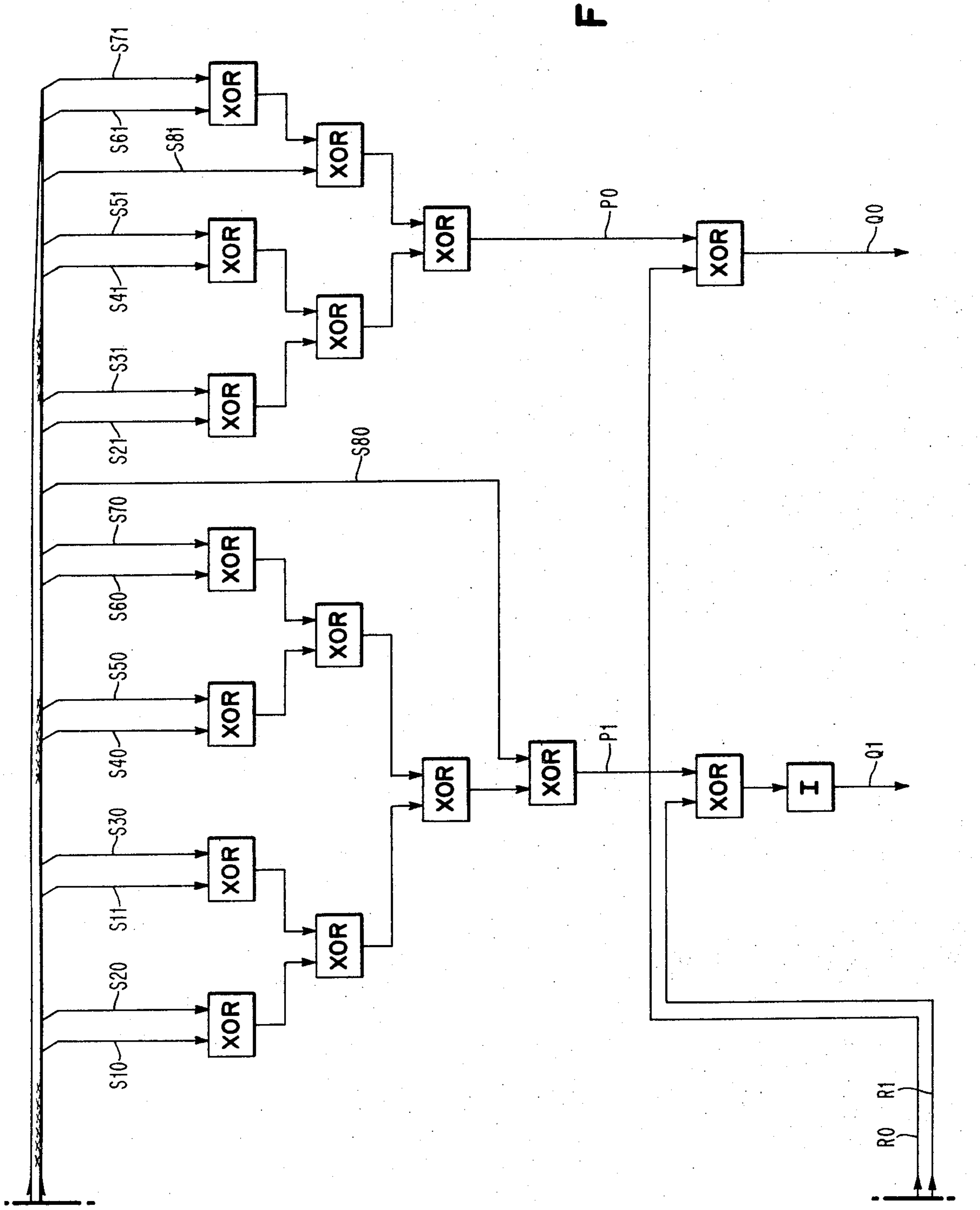

The coincidence circuit 16 consists of an XOR tree as shown in FIGS. 2F and 2G, for reducing the (P(0), P(1)) and (R(0), R(1)) indications to a single set of self-testable pair lines. Thus, $Q(0) = P(0) \oplus R(0)$ and $Q(1)) = \overline{P(1) \oplus R(1)}$. Referring to TABLE II, it is seen that (Q(.), Q(1)) is in code phase for cases 1 and 4 and in error space for cases 2 and 3. Moreover, the coincidence circuit 16 is self-testing and has testable inputs. Thus, the output pair (Q(0), Q(1)) indicates a double input data error and is self-testing, so the circuits which generate the dual output syndromes, the RCCO, and the parity check are self-testing as specified.

Single Error Correction

Figure 2H:
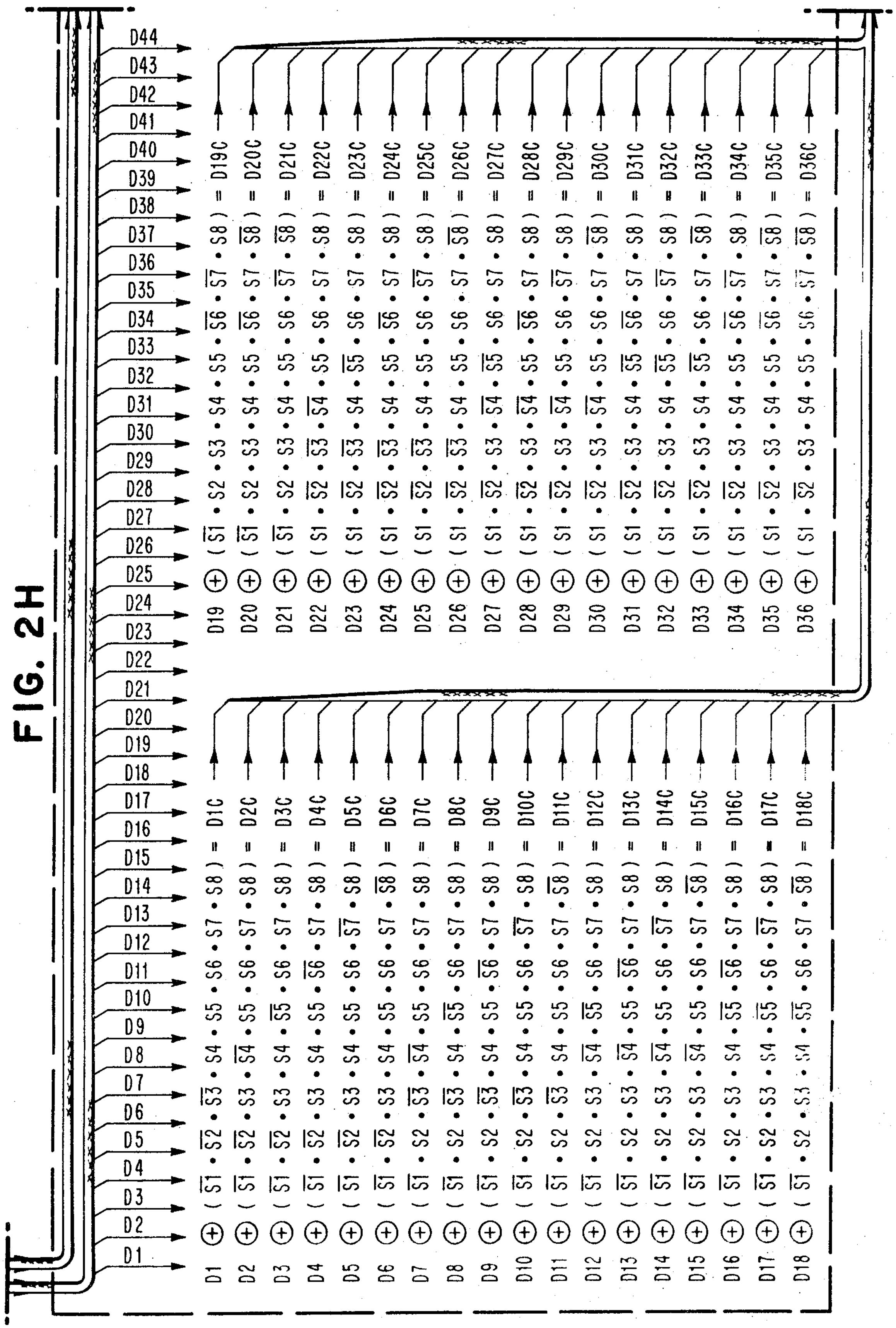
Figure 2I:
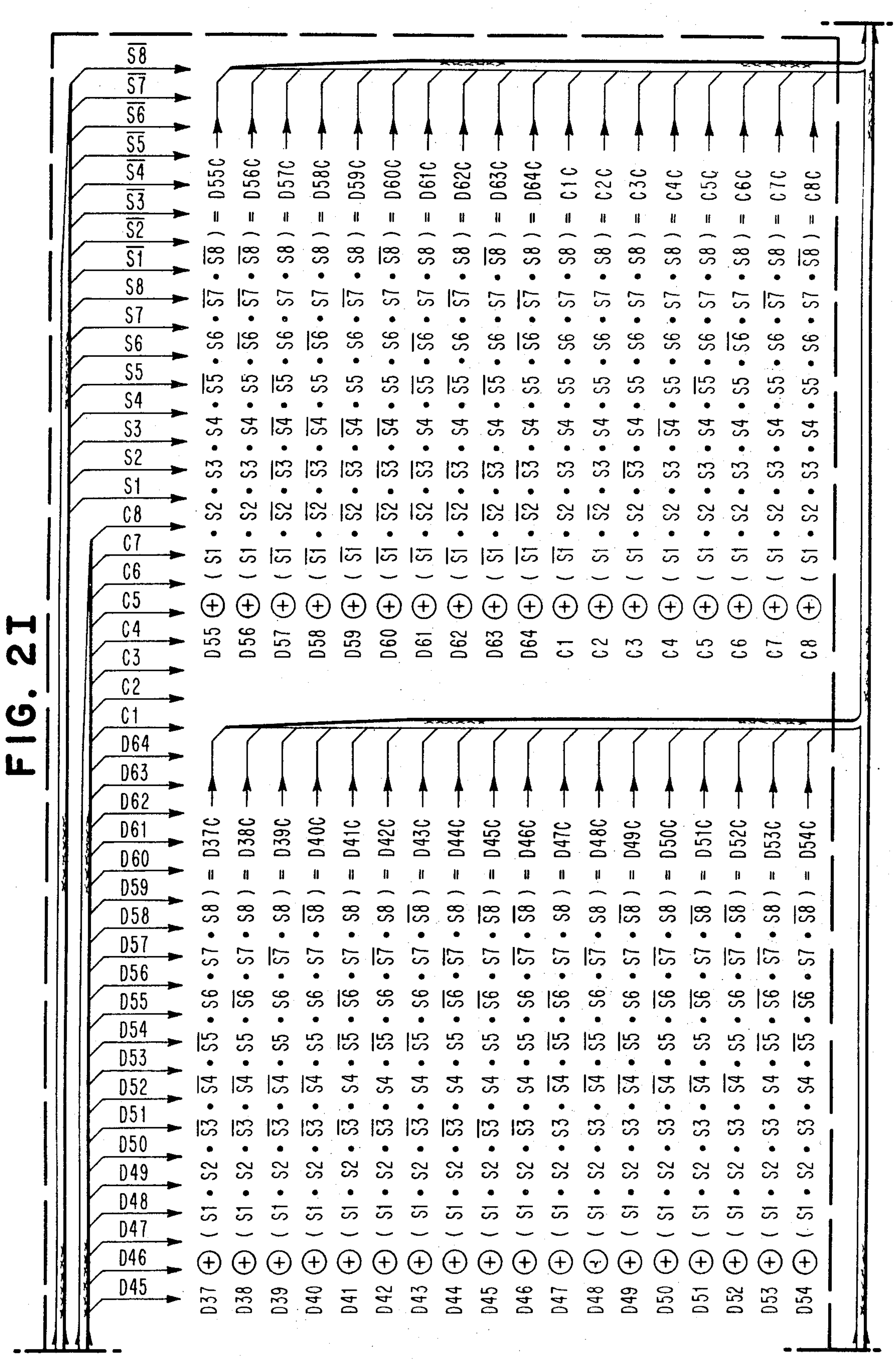
Figure 2J:
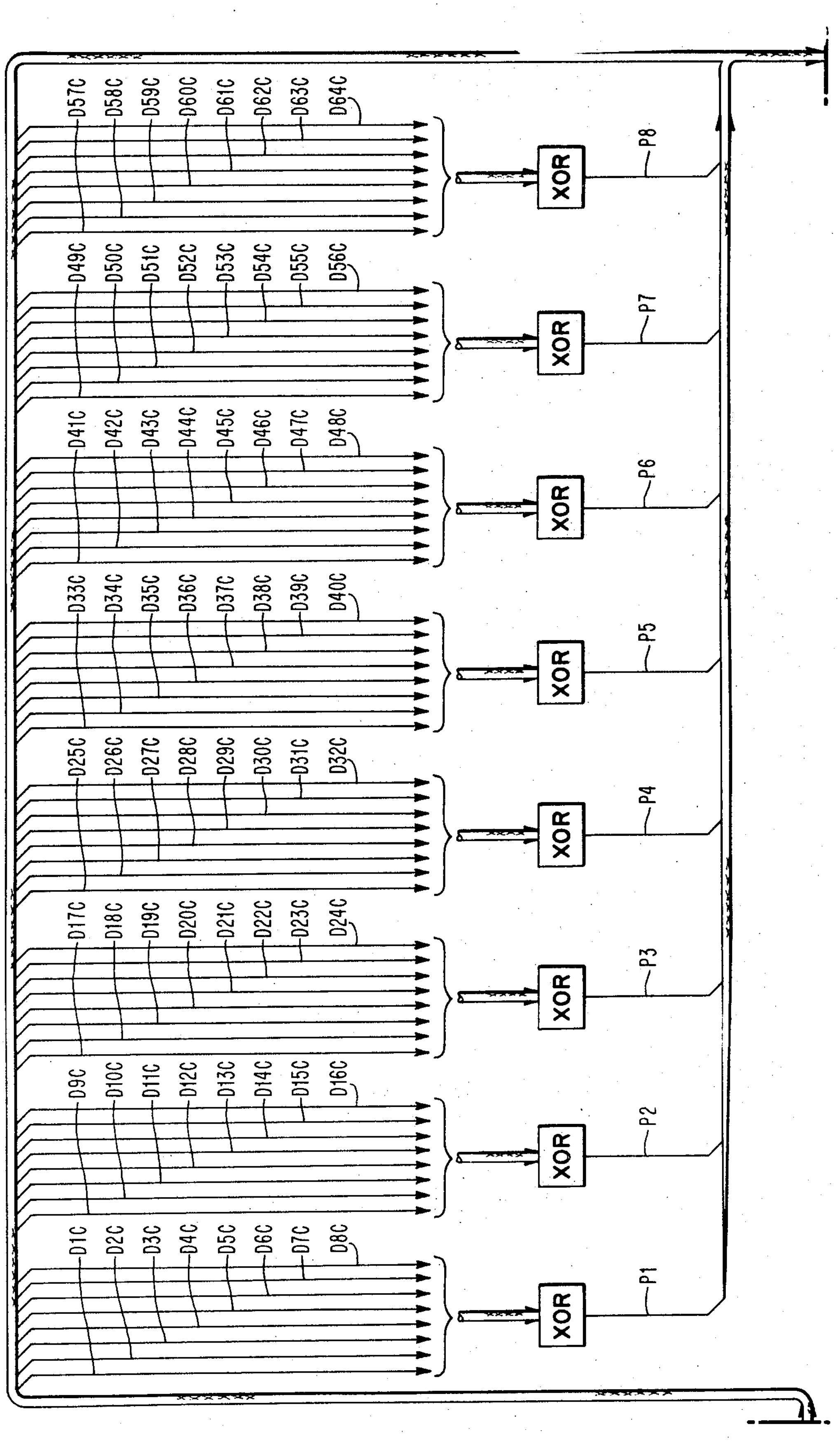
Figure 2K:
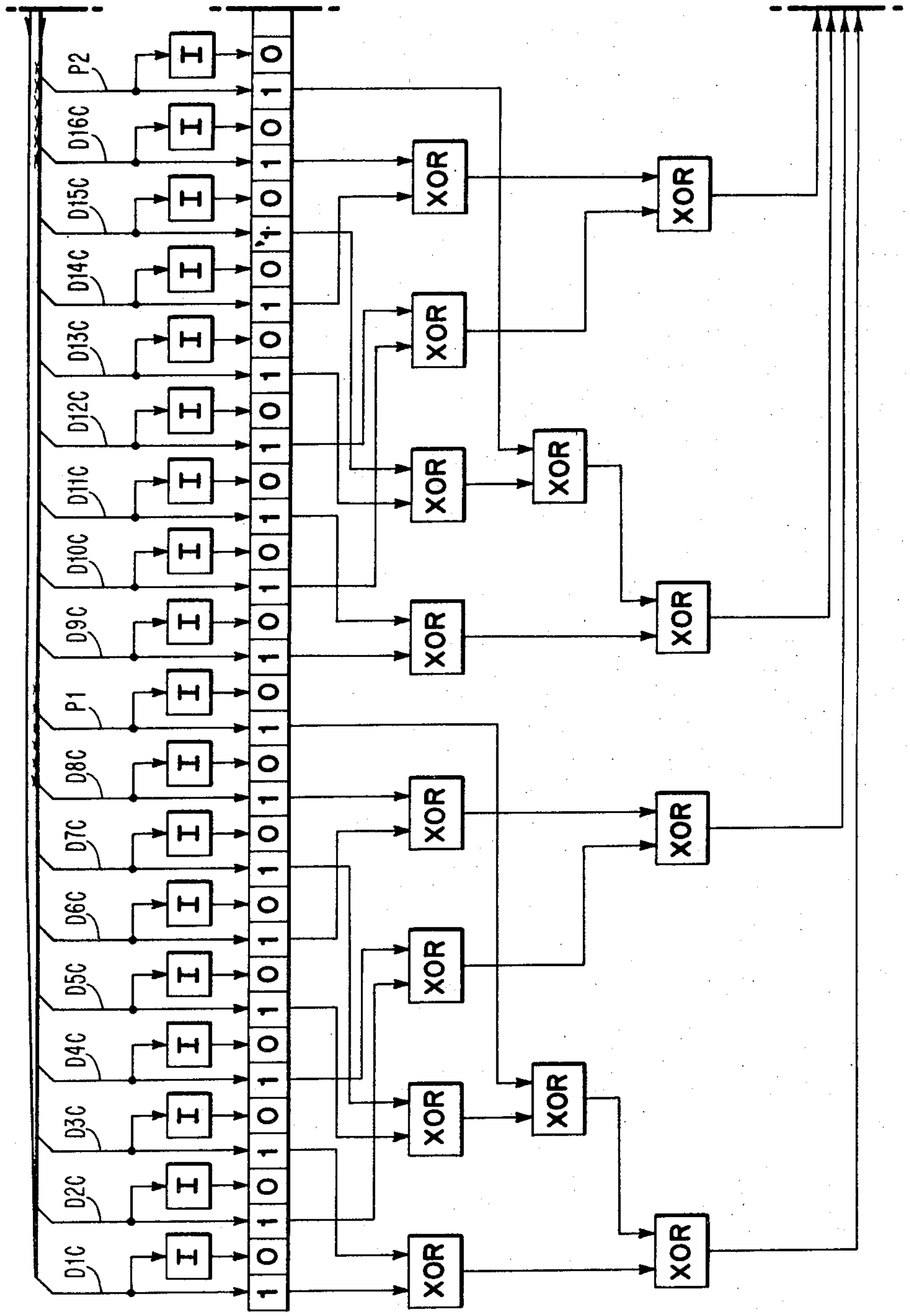
Figure 2L:
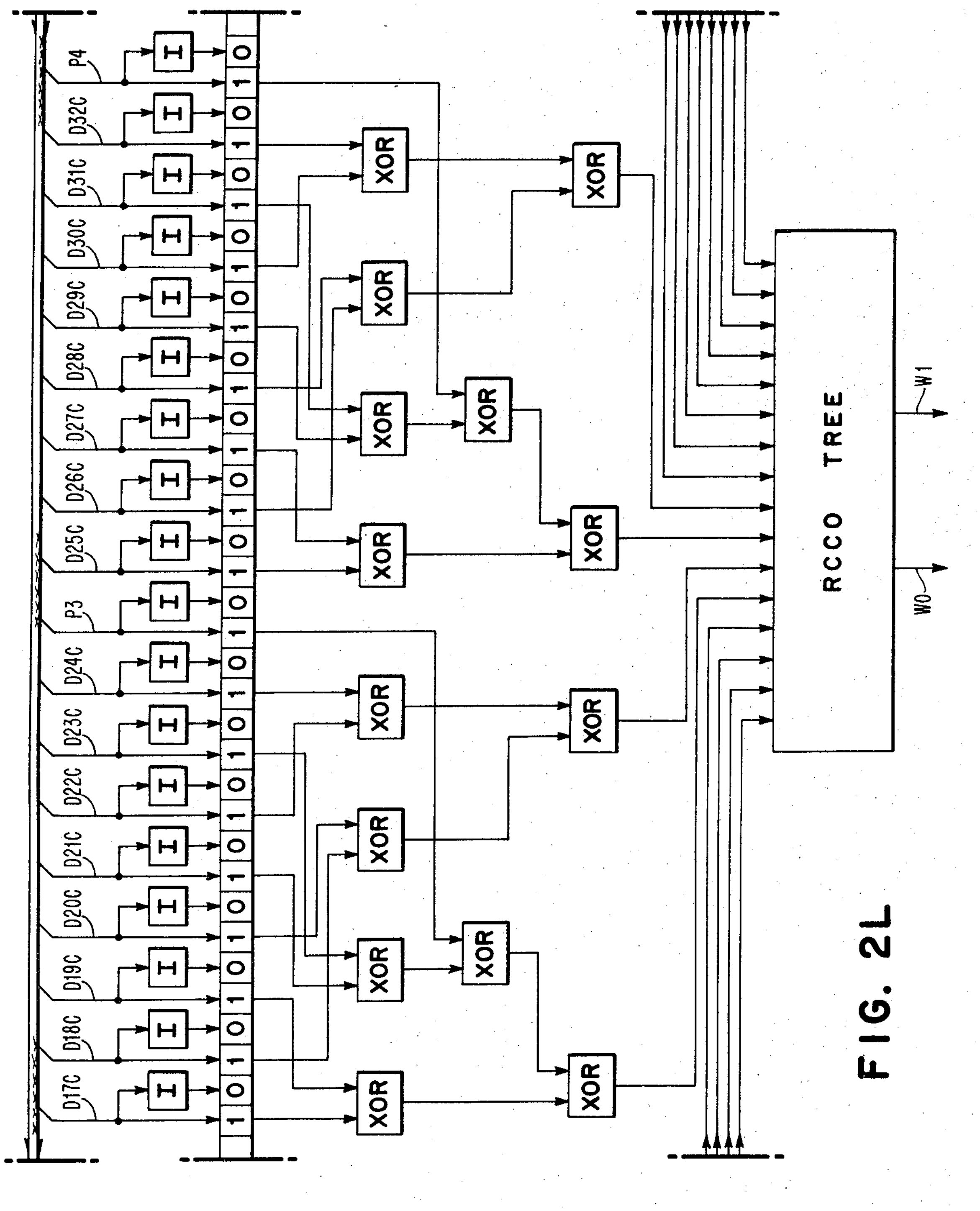
Figure 2M:
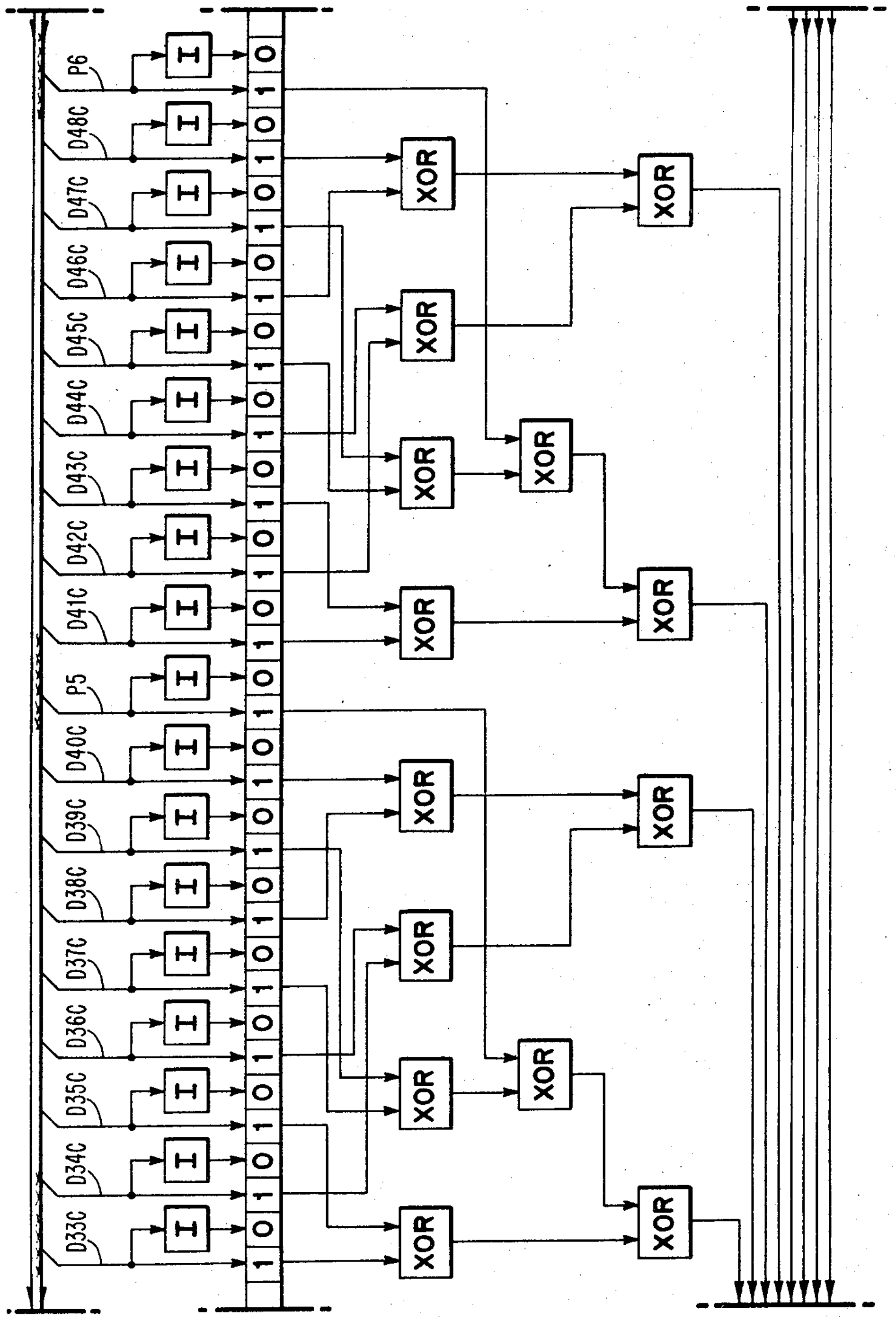
Figure 2N:
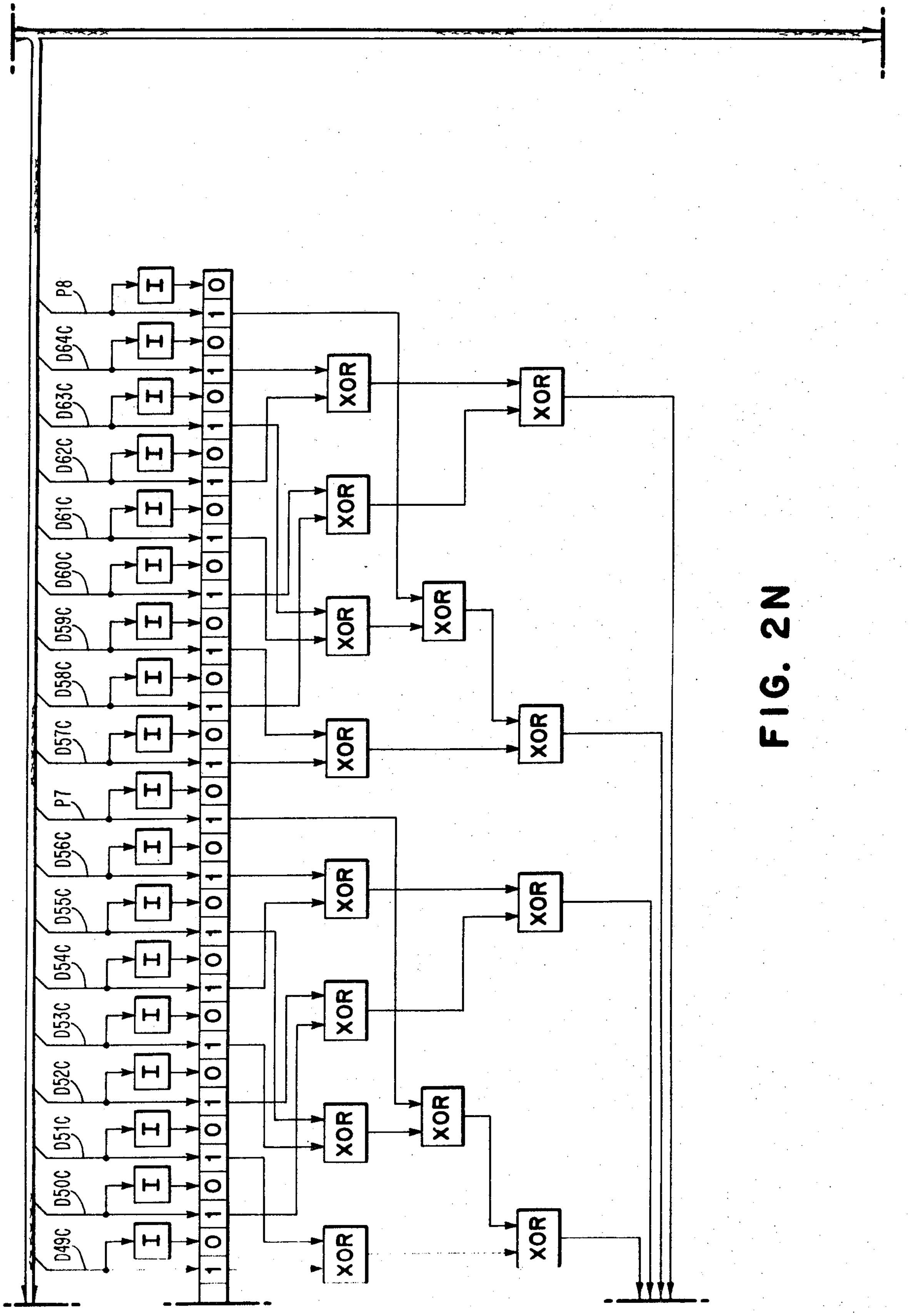

Referring again to FIG. 1, there is shown a single error correction circuit 17 for correcting all single errors in the data or check bits. The detailed circuit implementation of the single error correction circuit is shown in FIGS. 2H and 2I, where the specific Boolean functions whose output provides a corrected signal D(1C) through D(64C) and C(1C) through C(8C) are implemented. Note that in the notation used the letter C following the line designation indicates a corrected signal. For ease of understanding, the correction circuit is shown in terms of the Boolean expressions rather than in form of the actual logical gates required to implement these functions. Such implementation is within the ordinary skill of the art and needs no further discussion.

Referring to FIG. 2E, there is shown a plurality of exclusive OR gates for reducing the self-testing syndrome pairs to single lines $S(i)$ and $\bar{S}(i)$. Each exclusive OR circuit executes an exclusive OR between the two lines of the self-testing pairs. That is, $S(i) = s(i0) \oplus s(i1)$, where $i = 1, \ldots, r$ and independently generated is $\bar{S}(i) = \overline{s(i0) \oplus s(i1)}$, where $i = 1, \ldots, r$. Note that the independent generation of $S(i)$ makes the syndrome bits self-checking when the input data errors are either 0 or 1 and makes the syndrome self-testing over either code space or single error space.

The data or check bit correction circuit which implements the Boolean function in FIGS. 2H and 2I, is formed as the XOR of the data or check bits and the conjunct of syndromes formed by examining the column corresponding to the data or check bit in the parity check matrix. If the $i^{th}$ bit in the examined column is 0, then $S(i)$ appears unnegated (for odd parity) in the conjunct and, if the bit in the examined column is 1, then $S(i)$ appears negated. Therefore, if the $j^{th}$ column of a four row parity, corresponding to $D(j)$ is given as the transpose of (1110), then the $D(j)$ is expressed in its corrected form, as $D(jC)$, where $D(jC) = D(j) \oplus \bar{S}(1)\bar{S}(2)\bar{S}(3)S(4)$. The $\bar{S}(1)\bar{S}(2)\bar{S}(3$ )S(4) is the corrective conjunct of syndromes. In an odd parity case, where the data and check bits are correct, all syndrome bits S($i$) are at a 1 state and no corrections are made by the correction circuit. This means that the AND gates for executing the Boolean functions of FIGS. 2H and 2I for forming the corrective conjuncts, are tested for stuck-at-1 only when there are no input data errors.

Following the correction of all single data bit errors, each byte is introduced into a parity generation circuit identified in FIG. 1 as a byte-parity encoder 18. The output of encoder 18 is then introduced into MDR20.

Final Output Signal

Referring again to FIG. 1, there is shown three sets of check signals which are generated as outputs of the translator circuit. Each of these sets of signals are in the form of self-testing line pairs Q:(Q(0), Q(1)) W:(W(0), W(1)) and E:(E(0), E(1)). The generation of the Q self-testing line pairs was discussed above in the section entitled "Double-Input Error Detection". As stated therein, the four cases for the Q line pairs indicates either code space, double input data error or circuit error, circuit error, or single input data error. The output self-testing pairs W(0), W(1) indicate that at least a single failure in the circuit between the single error corrector and the W(0), W(1) output has occurred. In order to check the parity generation circuits in encoder 18, the data in the MDR20 is parity checked by XOR trees 21. The dual self-testing pair outputs of each of the self-testing parity checkers 21 are then introduced as inputs to an RCCO tree 22 which reduces the plurality of self-testing pairs to a single set of output lines W(0), W(1) which are self-testing.

Figure 20:
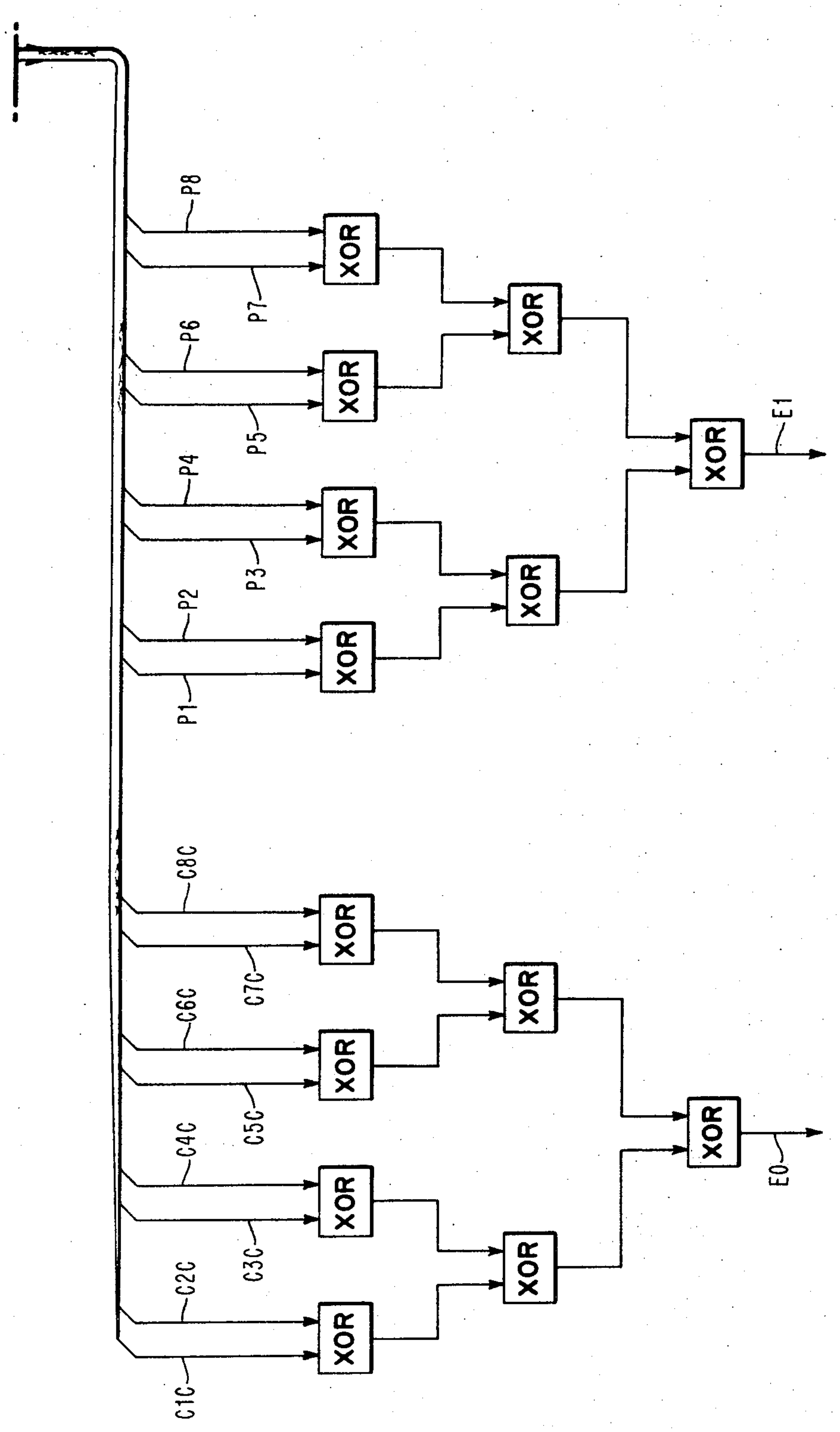

To implement the check of property 3 of the code, the generated parity bits P(1) through P(8) are fed into a single output parity check circuit 24 for generating output E(0). The check bits which are outputted from the single error correction circuit 17 are fed into a second parity check circuit 26 for generating output E(1). circuits 24 and 26 are shown as consisting of a tree of XOR circuits, as shown in further detail in FIG. 20. Both of these parity trees 24 and 26 are self-checking. The pair (E(0), E(1)) is in code space if the data bits D(1), . . . , D($k$) and the check bits C(1), . . . , C($r$) are correct. Note that in terms of the number of circuit elements required, it is more economical to perform the single error correction on single line inputs rather than on self-testable pairs. This is so because self-testable pairs would require a check of the single error correction circuit by means of tree circuits 24 and 26 and further, to perform correction in self-testable circuitry.

It should be recognized by those skilled in the art, that if it is desired to provide a single output self-testable pair for indicating either a single error or double error, such circuitry can be provided. Specifically, the single pairs, (Q(0), Q(1)), (W(0), W(1)) and (E(0), E(1)) can be reduced to a single error signal by means of an RCCO circuit similar to RCCO 22 and as taught in U.S. Pat. No. 3,559,167. However, for diagnostic purposes, separation of the different types of errors is desirable for planning a strategy of error recovery. Therefore, the preferred embodiment does not reduce the three pairs of self-testable pairs to a single self-testable output pair.

Memory WRITE Cycle

The above describes the preferred embodiment of the translator during a READ cycle from main store. It should be recognized that the same circuitry may be utilized for a WRITE cycle. In this case, the checked word is taken from the byte parity register 20 in byte parity encoded form and re-encoded into SEC/DED encoded form by means of the same self-testing translator. The check bits C($i$), are generated from the data bits in the incoming word as dictated by the parity check matrix. The same set of data bits that were combined through XOR trees in the READ cycle to form the syndromes S($i$) are used in the WRITE cycle to form the check bits C($i$) so that literally the same circuitry is used for both cycles. The generated check bits C($i$) are then checked by the parity bit P($i$) from the byte parity memory data register 20 by using the same circuitry with outputs (E(0), E(1)) which was utilized to check the output during the READ cycle.

It will thus be seen that the present invention provides an SEC/DED memory translator circuit which is self-testable during both a write and read operation from data store.

What is claimed is:

1. A self-testing translator system for translating coded data obtained from a computer main store, and for placing the resulting decoded data in a memory data register for subsequent processing, said system comprising:

data word register means connected to said main store for receiving and holding a coded data word consisting of data and check bits;

syndrome generator means connected to said data word register for providing a plurality of self-testing output line pairs that represent syndromes of said data words;

single error correction means connected to said data word register and to said syndrome generator for correcting all single errors which are present in said data word or in the coded check bits associated with said data word and for outputting correct data and check bits;

double error detection means connected to said syndrome generator means for detecting a double error in said coded data word;

parity encoding means connected to said single error correction means for allowing detection of errors in said correction means;

memory data register means connected to said parity encoder means for storing translated data words;

parity check means connected to said memory data register means for checking that the decoded data in said memory data register means is correct.

2. The system as defined in claim 1 wherein said double error detection means further comprises reduction circuit means for accepting a plurality of self-testable line pairs generated by said syndrome generator;

said reduction circuit providing a single set of self-testing output lines which in error space indicate a minimum of one error occurring in said data word;

syndrome parity check means for checking the even or odd state of said syndromes for determining a double error in said data word and providing a single set of self-testing output lines which in error space indicate a double error in said data word;

coincidence means for reducing the outpus from said reduction circuit means and said syndrome parity check means to a single pair of self-testing output line which in error space indicate detection of a double error.

3. The system as defined in claim 2 wherein said single error correction means comprises:

means for generating single line syndromes $S(i) = s(i0\, s(i1)$ and its negation $\overline{S}(i) = \overline{S(i0) \oplus S(i1)}$;

means for correcting data bit errors by executing the function $D(iC) = D(i) \oplus \mathrm{AND}i(Si\text{'s})$;

means for correcting check bit error by executing the function $C(jC) = C(j) \oplus \mathrm{AND}j\,(Si\text{'s})$.

4. The system as defined in claim 3 further comprising final output reduction means connected to said parity check means for reducing the plurality of self-testing output line pairs from said parity check means into a single set of self-testing output lines for indicating that an error occurred between said memory data register means and said final output reduction means.

5. The system as defined in claim 4 wherein said syndrome generator means comprises a first set of exclusive OR circuits;

a second set of exclusive OR circuits;

said first exclusive OR circuits forming a plurality of syndromes for subsections of said data word;

said second exclusive OR circuits independently forming a plurality of inverted syndromes for subsections of said data word.

6. The system as defined in claim 4 further comprising:

correction circuit check means connected to said single error correction means for determining that an erroneous correction of a data or check bit has occurred.

7. The system as defined in claim 6 wherein said correction circuit check means further comprises:

a first exclusive OR tree circuit connected to the plurality of parity bit output lines of said parity encoding means for reducing said plurality of parity lines to single output line that forms the first half of a self-testable output line pair;

a second exclusive OR tree circuit connected to the plurality of corrected check bit output lines of said single error correction means for reducing said plurality of check bit lines to a single output line that forms the second half of a self-testable output line pair.

* * * * *